(12) United States Patent
Kaltwang et al.

(10) Patent No.: US 11,308,368 B2
(45) Date of Patent: Apr. 19, 2022

(54) IMAGE PROCESSING USING GENERATIVE GRAPHICAL MODELS

(71) Applicant: Five AI Limited, Bristol (GB)

(72) Inventors: Sebastian Kaltwang, Cambridge (GB); John Redford, Cambridge (GB)

(73) Assignee: Five AI Limited, Bristol (GB)

( * ) Notice: Subject to any disclaimer, the term of this patent is extended or adjusted under 35 U.S.C. 154(b) by 0 days.

(21) Appl. No.: 17/056,400

(22) PCT Filed: May 17, 2019

(86) PCT No.: PCT/EP2019/062884
§ 371 (c)(1),
(2) Date: Nov. 17, 2020

(87) PCT Pub. No.: WO2019/219949
PCT Pub. Date: Nov. 21, 2019

(65) Prior Publication Data
US 2021/0224619 A1    Jul. 22, 2021

(30) Foreign Application Priority Data
May 18, 2018  (GB) ...................................... 1808148

(51) Int. Cl.
G06K 9/62       (2006.01)
G06K 9/46       (2006.01)
G06N 3/04       (2006.01)

(52) U.S. Cl.
CPC ........... *G06K 9/6296* (2013.01); *G06K 9/469* (2013.01); *G06K 9/6224* (2013.01); *G06K 9/6277* (2013.01); *G06N 3/0454* (2013.01)

(58) Field of Classification Search
None
See application file for complete search history.

(56) References Cited

PUBLICATIONS

Laferte et al., "Discrete Markov image modeling and inference on the quadtree." IEEE Transactions on image processing 9, No. 3 (2000): 390-404. (Year: 2000).*

(Continued)

*Primary Examiner* — Feng Niu
(74) *Attorney, Agent, or Firm* — Wolf, Greenfield & Sacks, P.C.

(57) ABSTRACT

An image processing technique is presented using a hierarchical image model. The technique may be used as a precursor to subsequent image processing, to fix detected images in a post processing stage or as a segmentation or classification stage. The techniques may also be applied to super resolution. In a first layer of the hierarchical image model, each observed pixel of the image has a representation allocated to one or more input nodes. A set of the input nodes are assigned to a hidden node of a second layer, and a duplicate set of input nodes of the first layer is assigned to a duplicate of the hidden node in the second layer. In this way, a dense latent tree is formed in which a subtree is duplicated. Variables are assigned to the input nodes, the hidden node and the duplicate nodes and recurringly modified to process the image. Belief propagation messages may be utilised to recursively modify the variables. An image processing system using the method is described. A planning system for an autonomous vehicle comprising the image processing system is described.

20 Claims, 11 Drawing Sheets

(56) References Cited

PUBLICATIONS

Irving et al., "An overlapping tree approach to multiscale stochastic modeling and estimation." IEEE Transactions on Image Processing 6, No. 11 (1997): 1517-1529. (Year: 1997).*
Adams, Nicholas J. "Dynamic Trees: A Hierarchical Probabilistic Approach to Image Modelling." (2001). (Year: 2001).*
Jégou et al., The one hundred layers tiramisu: Fully convolutional densenets for semantic segmentation. Proceedings of the IEEE conference on computer vision and pattern recognition workshops (CVPRW). Nov. 19, 2017.
PCT/EP2019/062884, Sep. 23, 2019, International Search Report and Written Opinion.
International Search Report and Written Opinion for International Application No. PCT/EP2019/062884, dated Sep. 23, 2019.
Abadi et al., Tensorflow: Large-scale machine learning on heterogeneous distributed systems. ArXiv preprint arXiv:1603.04467v2. Mar. 16, 2016;2:1-19.
Bouman et al., A multiscale random field model for Bayesian image segmentation. IEEE Transactions on image processing. Mar. 1994;3(2):43 pages.
Choi et al., Learning latent tree graphical models. Journal of Machine Learning Research. 2011;12:1771-812.
Eslami et al., A generative model for parts-based object segmentation. Advances in Neural Information Processing Systems. 2012:1-9.
Eslami et al., The shape boltzmann machine: a strong model of object shape. International Journal of Computer Vision. Apr. 1, 2014;107(2):1-8.
Goodfellow et al., Generative adversarial nets. Advances in neural information processing systems. 2014:1-9.
Hinton, A Practical Guide to Training Restricted Boltzmann Machines. Technical report, University of Toronto. Aug. 2, 2010;1:1-20.
Kingma et al., Auto-encoding variational bayes. ArXiv preprint arXiv:1312.6114v10. May 1, 2014;10:1-14.
Lecun et al., The MNIST database of handwritten digits. Yann.Lecun.com. 1998:7 pages. http://yann.lecun.com/exdb/mnist/ [last accessed Nov. 12, 2020].
Moerad et al., A survey on latent tree models and applications. Journal of Artificial Intelligence Research. May 30, 2013;47:157-203.
Ronneberger et al., U-net: Convolutional networks for biomedical image segmentation. ArXiv preprint arXiv:1505.04597v1. May 18, 2015;1:1-8.
Salakhetdinov et al., Deep boltzmann machines. Proceedings of the $12^{th}$ International Conference on Artificial intelligence and statistics (AISTATS) 2009. Apr. 15, 2009:448-455.
Salakhetdinov et al., Efficient learning of deep Boltzmann machines. Proceedings of the thirteenth international conference on artificial intelligence and statistics. Mar. 31, 2010:693-700.
Storkey et al., Image modeling with position-encoding dynamic trees. ResearchGate. Jun. 20, 2002:1-38.
Sedderth et al., Learning hierarchical models of scenes, objects, and parts. Tenth IEEE International Conference on Computer Vision (ICCV'05) vol. 1. Oct. 17, 2005;2:1331-1338.
Van Den Oord et al., Conditional image generation with PixelCNN decoders. Advances in neural information processing systems. 2016:4790-4798.
Xiao et al., Fashion-MNIST: a novel image dataset for benchmarking machine learning algorithms. ArXiv preprint arXiv:1708.07747v2. Sep. 15, 2017;2:1-6.

\* cited by examiner

Table 1

Table 2

Table 3
Figure 11

IMAGE PROCESSING USING GENERATIVE GRAPHICAL MODELS

RELATED APPLICATIONS

This application is a national stage filing under 35 U.S.C. § 371 of international application number PCT/EP2019/062884, filed May 17, 2019, which claims priority to British application number 1808148.9 filed May 18, 2018.

FIELD

The present disclosure relates to processing images using generative graphical models, and in particular but not exclusively to addressing problems which arise when images are incomplete.

BACKGROUND

In the context of autonomous vehicles, images of objects are one of the main inputs into the automated prediction and planning systems of the autonomous vehicle. Autonomous vehicles may include trains, cars, drones and any other type of moving vehicle or conveyance. In the context of driven autonomous vehicles, such as cars, there is a requirement to predict driving lanes on the street, which can in principle be predicted from images received from on vehicle cameras. However, often, lanes are only partially visible due to occlusions from vehicles, buildings and other objects. Thus, the observed part of the image to be defined as road has holes (obscured parts) where it is unclear if there is a lane or not. Image data may be incomplete for a number of different reasons, not just occlusions. For example, only parts of the image may be observed at all, due to inherently sparse sensors. Furthermore, in autonomous vehicles, images captured by the on vehicle image sensors have to accommodate very fast speed and potentially rough rides (displacing cameras), which all lead to imperfect images being captured.

There are a number of challenges to address. As mentioned, in a planning or prediction stage, it improves the accuracy of predictions if images are more complete. Moreover, in training models which will later be used to classify images, it is extremely useful to be able to train models on the incomplete images that are available. According to the present state-of-the-art, models may only be trained on incomplete images if the complete images are also available to feedback into the training process. There are currently no techniques available for effectively training models using incomplete images, where there is no complete version of the image. The present disclosure addresses this challenge. That is, a model presented herein can be trained in an unsupervised manner with images with missing parts and never needs to receive the full image during training.

Another challenge which arises is to complete an image which is incomplete, through sparseness or which does not convey necessary information in the part of the image that is important to a future planning system.

Another application of the techniques provided herein is to complete an incomplete image. In other words, unseen parts of a scene can be added into the image, for example as a precursor to processing the image in a convolutional neural network (CNN) or other artificially intelligent computer system.

SUMMARY

The techniques described herein address the above and other challenges in the context of processing images, in particular for autonomous vehicles, although other applications are envisaged. The techniques may be used as a precursor to subsequent image processing, for example to fix corrections in RGB pre-processing. The techniques may also be used to fix detected images in a post processing stage.

When used in a classifier (such as a CNN or other model) the aim of the classification is to be able to classify and identify parts of the visible scene. The present techniques can be used in classification to replace an existing classifier or after classification to complete classification outputs.

The techniques also have application in super resolution, that is generating a version of the image which has been received at a first resolution in a higher resolution. The techniques do not just effect a simple interpolation, but provide a translation between resolutions in a manner that is context aware.

While the techniques described herein are described in the preferred examples as being applicable to images, they are also more broadly applicable to scenarios where a model captures a local spatial distribution. For example, they could be used in contexts where relative adjacency of words is to be trained/classified.

One aim of the techniques described herein is to complete context within an image, for example to provide a bird's eye view of a scene partially occluded by an occluding object with the occluding object having been removed from it, such that the underlying part of the image (obscured by the object) is known.

The inventors have devised a new class of graphical model embodying in a computer memory a representation of an image to be processed. In the new class of graphical model child parent loops inherent in previously known models are broken up by duplicating nodes of the model. A node represents part of an image. In a single layer representation on the lowest layer a multiple layer hierarchical representation, each node is assigned a variable representing the pixel at that node. The variable could be observed or latent. This enables very efficient inference and sampling algorithms to be developed. In this context, efficiency is determined by linear memory and time complexity parameters, replacing algorithms with quadratic complexity.

Based on the new structure, likelihood estimation methods can be significantly simplified by passing only a subset of messages between nodes. This leads to an inference complexity of O (N) instead of $O(N^2)$ for other algorithms, where N is the number of input nodes. Input nodes are nodes representing pixels of an image.

The representation according to the new class of graphical model offers efficient sampling. As explained later, the structure of the new class of model introduces the concept of duplicated nodes. The inventors have devised a sampling technique which forces all duplicates to the same value. This leads to a sampling complexity of O (N) instead of O ($N^2$) when compared with existing algorithms.

The techniques described herein use a layered model of an image, wherein different layers represent different layers of information in the scene. A generative graphical model is described in which each of a set of nodes in each layer is represented by a random variable. This contrasts with neural networks, e.g. CNNs, where each node represents a computation function with activations. In the present model, variables in a lowest layer can represent pixels in an image, while variables in high layers represent subparts/parts of the image. A part may comprise multiple subparts of a lower layer, and a subpart may comprise pixels in the lowest layer. Parts/subparts may have certain shapes. Each node has a location which defines its position in the image.

The sampling process can sample a probable image that would lead to a particular shape at a particular location, the shape being generated at an upper layer of the multi layer model.

According to one aspect of the present disclosure there is provided a computer implemented method of processing an image comprising a plurality of pixels, using a hierarchical image model wherein:

in a first layer of the model each observed pixel of the image is allocated to an input node of the first layer, a set of the input nodes is assigned to a hidden node of a second layer representing a part or subpart of the image in the second layer, to create a subtree for the hidden node, a duplicate set of the input nodes is assigned to a duplicate of the hidden node in the second layer representing the same part of the image, thereby forming a dense latent tree in which the subtree is duplicated such that no node shares a parent in the dense latent tree yet all parent-child relationships between the first and second layers are represented.

The method is implemented in a computer by a computer program executed in one or more processors and having access to one or more computer memory.

Multiple subtrees may be duplicated in the model, but not all subtrees necessarily have duplicates. The model may have multiple layers (third, fourth etc.).

Another aspect of the invention provides a generative graphical model implemented in a computer system for processing spatial relationships as a plurality of nodes arranged in layers, the model comprising a plurality of kernels, each kernel having a group of input nodes for receiving observations in a lowest layer of the model, and a root node representing a latent variable in an upper layer of the model, wherein the model comprises additional nodes assigned as duplicate nodes to form a duplicate set of each of at least some of the input nodes, wherein the duplicate node is connected in a duplicate subtree resembling the subtree of the input node of which it is a duplicate whereby each input is exclusive for a specific kernel and no node has multiple parents.

That is, in the novel model, each node has exactly one parent.

As mentioned, the model is particularly useful in the processing of partly complete images, although it has other applications. In one embodiment, a full image may be received and each of the input nodes in the lowest layer is assigned to a known pixel (observation) of the input image. In another embodiment, the image is partially complete and in this case, at least some input nodes are represented as latent variables rather than observations.

For use in likelihood estimation, another aspect of the invention provides a method of generating belief propagation messages in a multi-layered graphical model of the preceding type in which each kernel has k input nodes by:

determining for each state f in a child layer a state product of (i) the conditional probability that x is in that state f when y is in state g, where x is an observed variable of a child node at a first location and y is the latent variable of a parent node of the child node, and (ii) a belief propagation message for a child node at a second location displaced by k nodes from the first location;

summing the state products over all states in the child layer of each kernel to generate a state sum of each child node of each kernel; and generating for each kernel product of the state sums for each kernel, the kernel product being a unique belief propagation message to propagate to the parent node.

The method has a useful feature for improving computational efficiency. Only a subset of belief propagation messages needs to be calculated, the number for each layer being equal to the number of spatial positions in the layer. Moreover, when used with the new graphical model a belief propagation message from each child node is useful in more than one calculation due to the overlapping relationships between children and parents caused by the duplicates. This enables a strong connection between all neighbouring pixel pairs to be modelled, allowing partially complete images to be effectively classified and sampled. Furthermore, unsupervised training can be carried out using incomplete images, In an aspect of the invention only unique belief propagation messages need to be calculated and stored.

The method of likelihood estimation defined above advantageously relies on the novel model presented herein, wherein the network is modelled as a plurality of kernels, at least some kernels having a parent node in the parent layer and a duplicate set of child nodes in the child layer. Note that not all kernels in the model need to be assigned duplicate sets, only a sufficient number to satisfy the requirement that each kernel has an exclusive node as its input and no node has multiple parents. This enables the generation of a subset of unique belief propagation messages calculated as defined above.

The definitions utilised herein are derived from known Bayesian graphical model techniques. A belief propagation message represents the marginal distribution for each unobserved node, conditional on any observed ancestral nodes. In particular it is represented as a vector of F elements, where F is a number of states that a node in a layer L can be defined as, each element having a position ID, a state ID and a layer ID. The position ID defines the position of the node in the model relative to the image that it is representing, the state ID defines the state representing one of the possible states, and the layer ID defines the layer of the model in which the node is present. Belief propagation messages are calculated recursively to achieve convergence. By determining only a subset of belief propagation messages, enabled by the model, likelihood estimation is made more efficient both for inference and training. In these cases, belief propagation messages are passed 'up' the model from the input layer nodes to the root nodes in the top layer.

Another aspect of the invention provides a method of training a neural network using a graphical model as defined herein, the method comprising generating a set of unique belief propagation messages according to the above aspect of the invention, calculating the marginal likelihood of the model by summing over all possible states in the root node the product of the prior weight and a belief propagation message for the root node, and targeting the log of the marginal likelihood using stochastic gradient ascent (SGA).

In this context, a weight is a probability for the child that the parent node is in a certain state.

It will be appreciated that other methods of achieving convergence may be utilised than targeting the log likelihood and optimising it via SGA, but the use of SGA incorporates known advantages of SGA, for example training on arbitrary large data sets. The important feature of the new training method is to utilise the subset of unique belief propagation messages that depend on the new model presented herein. The training is effective in the context of images with missing parts or occluded parts.

According to another aspect of the invention, there is provided a method of sampling using a generative model as defined above. According to the method, all nodes in the duplicate set are enforced to take the same value during sampling. The method of sampling further makes use of the generation of a unique belief propagation message defining the state for each non-duplicate node in each layer. In the case of sampling, belief propagation messages are calculated 'top down', i.e. from the root node, and duplicates in each layer are managed by obtaining the product over the duplicates of the posteriors to the duplicate nodes to generate a probability distribution for the duplicate nodes in that layer from which samples may be derived for each position in the layer.

The invention also provides a computer program and a programmed computer for implementing these methods; as well as a planning system for an autonomous vehicle.

An autonomous vehicle, also known as a self-driving vehicle, refers to a vehicle which has a sensor system for monitoring its external environment and a control system that is capable of making and implementing driving decisions autonomously using those sensors. This includes in particular the ability to automatically adapt the vehicle's speed and direction of travel based on inputs from the sensor system. A fully autonomous or "driverless" vehicle has sufficient decision making capability to operate without any input from a human driver. However the term autonomous vehicle as used herein also applies to semi-autonomous vehicles, which have more limited autonomous decision-making capability and therefore still require a degree of oversight from a human driver.

Autonomous decision making is a critical function of an autonomous vehicle. This is true whatever its level of autonomy, but as the level of autonomy increases, so too does the complexity of the decisions it needs to be able to make safely, to the point where a fully autonomous vehicle needs to be equipped with an exceptionally robust decision making engine that can be relied upon to safely handle any driving scenario it encounters, however unexpected.

According to a further aspect of the invention there is provided a computer implemented method of processing an image comprising a plurality of pixels, using a hierarchical image model stored in computer memory wherein:
- in a first layer of the model each observed pixel of the image is allocated to one or more input node of the first layer,
- a set of the input nodes is assigned to a hidden node of a second layer representing a part or subpart of the image in the second layer, to create a subtree for the hidden node, in which the hidden node is a parent node and the input nodes are child nodes,
- a duplicate set of input nodes of the first layer is assigned to a duplicate of the hidden node in the second layer representing the same part or sub part of the image, thereby forming a dense latent tree in which the subtree is duplicated such that no child node shares a parent in the dense latent tree yet all parent-child relationships between the first and second layer are represented,
the method comprising, by at least one processor coupled to access the memory, assigning variables to the input nodes, the hidden node and the duplicate node and recurringly modifying the variables to process the image.

Each observed pixel of the image may be allocated to input nodes of the first layer by storing a respective observation variable in a computer memory in association with an identifier of the input nodes. For example, the observation variables may use categorical distributions where each state represents a grey-scale intensity value. The bit size of the observations may be adapted depending on the hierarchical image model—that is the nature of the image processing. In one embodiment, 256 bit RGB (Red, Green, Blue) colour images can be used as model input by including three 256 state modes in the first layer per spatial pixel location.

One purpose is to complete incomplete images. Where the image is incomplete each non-observed pixel of the image maybe allocated to input nodes of the first layer by storing a respective latent variable in a computer memory in association with an identifier of the corresponding input nodes of the first layer.

The method may comprise processing the image by sampling the modified variables to sample a probable image part defining a particular shape at a particular location in the image, the particular shape being generated at the second or a higher layer in the hierarchical image model, wherein all nodes in each duplicate set are constrained to take the same value during sampling.

The method may be a precursor processing system to complete an incomplete image prior to subsequent processing, the image being completed by recurringly modifying variables of input nodes to which no observation variable was assigned.

The method may comprise the step of subsequently processing the complete image in a convolutional neural network or other artificial intelligent classification system.

The method may be applied to process images output from a segmentation computer system to complete any missing pixels of the output segmentation image and/or re-sample probable images. Segmentation may be considered a specific form of classification. That is, the method may apply to segmentation outputs that are incomplete to complete the output. Now the segmentation image is comprised of pixels, where each pixel defines a class association.

The method may be used in a classification computer system to classify parts or subparts of a captured image representing a scene in which some parts of the scene are obscured in the captured image.

The method of processing the image may comprise generating a version of the image which has been received at a first resolution in a higher resolution, by assigning latent variables to some of the input nodes of the hierarchical image model in the higher resolution. The pixels may be arranged on a grid, and e.g. for doubling the resolution 1 pixel of a 2×2 square would be observed while the other 3 are latent.

The hierarchical image model may have at least one or more further layer, wherein nodes in the second layer represent sub-parts of the image and nodes in the one or more further layer represents a part of the image comprising multiple sub-parts of the second layer.

The method may comprise storing in a computer memory, a respective random variable, assigned to each hidden node of the second layer in a first step, and modifying the random variable in subsequent steps to converge on a set of probable variables for the hidden nodes of the second layer.

Another aspect of the invention provides a generative graphical model stored in a computer memory of an image processing system for processing spatial relationships as a plurality of nodes arranged in layers, the model comprising a plurality of kernels, each kernel having a group of input nodes for receiving observations in a lowest layer of the model, and a root node representing a latent variable in an upper layer of the model, wherein the model comprises additional nodes assigned as duplicate nodes to form a duplicate set of each of at least some of the input nodes, wherein the duplicate nodes are connected in a duplicate subtree resembling the subtree of the input node of which it is a duplicate whereby each input node is exclusive for a specific kernel and no node has multiple parents.

The generative graphical model may be used in the processing of partly complete images to generate probable image data of parts or subparts of the image by recurringly modifying the latent variable of the root node.

The generative graphical model may be such that all input nodes in the lowest layer have observations assigned to them.

The generative graphical model may be such that some input nodes in the lowest layer have observation values assigned to them, and other nodes in the lowest layer have latent variables assigned to them.

Another aspect of the invention provides a method of generating belief propagation messages in a multi-layered generative graphical model in which each kernel has k child nodes in a child layer and a parent node in a parent layer the method comprising for each kernel,
   determining for each state f of a child node at a first location a state product of (i) a kernel weight for each state f and (ii) a belief propagation message for a child node at a second location displaced by k nodes from the first location;
   summing the state products over all states in the child layer to generate a state sum of for each child node;
   generating for each parent node a kernel product of the state sums, the kernel product being a unique belief propagation message to propagate to the parent node.

The kernel weight for each state f may be determined as the conditional probability that x is in that state f when y is in state g, where x is an observed variable of a child node at a first location and y is the latent variable of the parent node.

The method may comprise the step of calculating and storing in a computer memory only a subset of belief propagation messages, the number in the subset for each layer being equal to the number of spatial positions in the layer.

The method may be used in a sampling process to sample a probable image part defining a particular shape at a particular location in the image, the particular shape being generated at a parent layer by propagation of the belief propagation messages between layers.

The method of sampling may make use of the generation of a unique belief propagation message defining the state for each non-duplicate node in each layer.

The method may be used in a classification computer system to classify images, and/or a segmentation system.

Another aspect provides a method of training a neural network using a generative graphical model, the method comprising:
   generating a set of unique belief propagation messages for propagation from each child node in a child layer to its parent node in a parent layer;
   calculating the marginal likelihood of the model by summing over all possible states in a root node of the model the product of the prior weight of the root node and the belief propagation message for the root node, and
   optimising the marginal likelihood using a neural network optimisation algorithm.

The step of generating the belief propagation messages may be performed as defined above or described further herein.

The neural network optimisation algorithm may target the log of the marginal likelihood using stochastic gradient ascent.

Another aspect provider or image processing computer system comprising one or more computers programmed to implement any of the methods defined above, the one or more computers comprising a processor arrange to execute one or more computer programs and computer memory accessible by the one or more processors for storing variables allocated to the nodes of the model representing the image.

The image processing computer system may be an image classifier or segmentation system.

The image processing system may be a pre-cursor computer system for carrying out image processing prior to supplying image data to the image classifier.

The image processing computer system may be a post-processing stage for completing classification outputs generated by a classifier.

Another aspect provides a planning system for an autonomous vehicle comprising an image processing system as defined herein and an image capture system to supply image data to the image processing system.

Another aspect provides a computer program product comprising executable code in a transitory or non-transitory form which when executed by a computer carries out any of the above defined methods.

The invention offers a method of processing positional data, such as pixels in an image, by providing a model in which at least some observational and latent nodes are duplicated, and processing data assigned to the nodes such that data of adjacent nodes (node pairs) is strongly connected in the model. This is a powerful way of showing positional relationships and enabling latent variables to be determined.

For a better understanding of the present invention and to show how it may be carried into effect references will now be made by way of example to the accompanying drawings.

BRIEF DESCRIPTION OF THE DRAWINGS

FIG. 11 is Table 3 showing sampling results to compare models trained on incomplete data.

DESCRIPTION OF THE EMBODIMENTS

Figure 1:
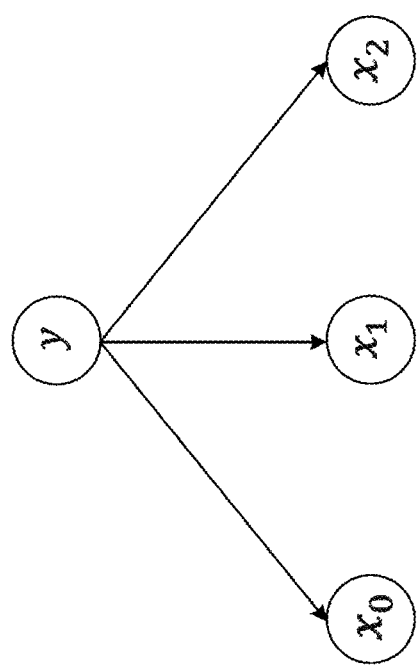
FIG. 1 is an example of DCT kernel.
Figure 1A:
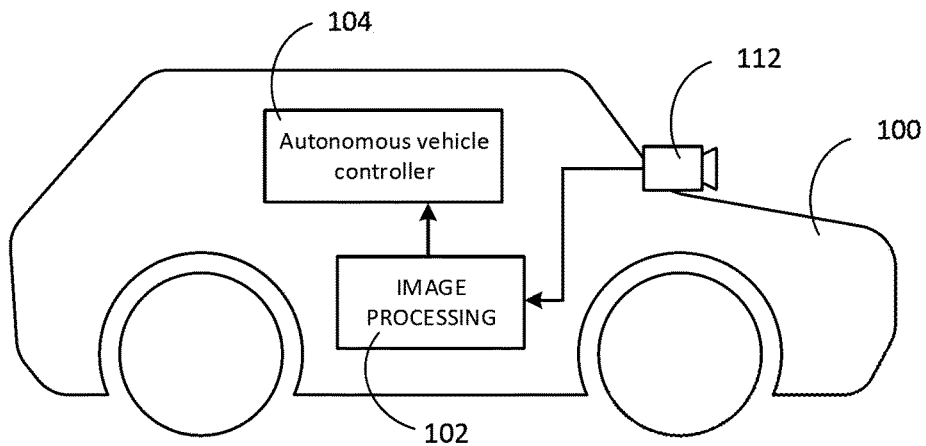
FIG. 1A is a schematic block diagram of an autonomous vehicle.
Figure 1B:
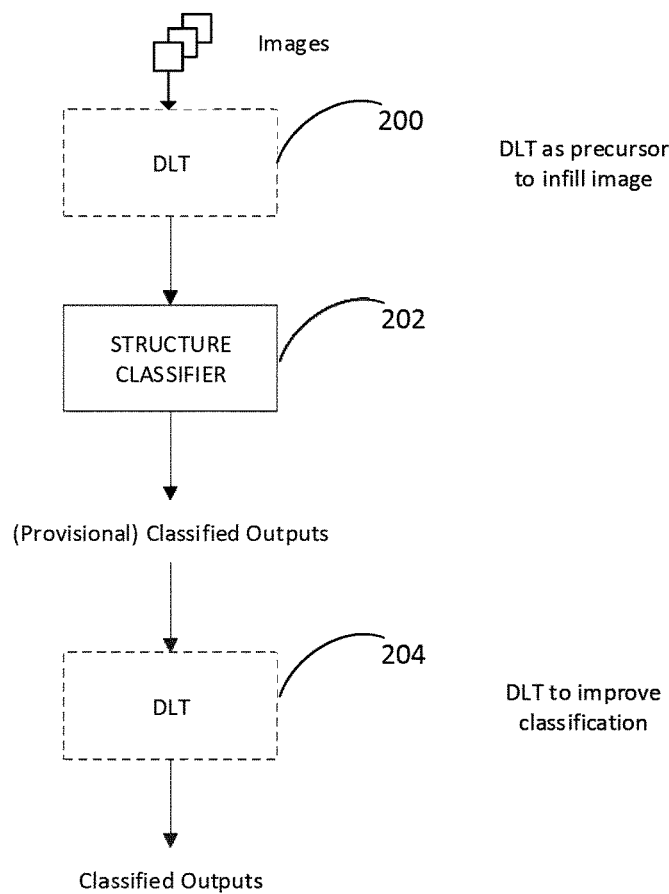
FIG. 1B is a schematic function diagram showing different applications of a Dense Latent Tree (DCT) model in image processing.

FIG. 1A shows a highly-schematic block diagram of an autonomous vehicle 100, which is shown to comprise an image processing component 102, having an input connected to at least one image capture device 112 of the vehicle's sensor system and an output connected to an autonomous vehicle control system (controller) 104. In use, the image processing component 102 of the autonomous vehicle 100 detects structure within images captured by the image capture device 112, in real time, and the autonomous vehicle controller 104 controls the speed and direction of the vehicle based on the results, with no or limited input from any human. The image processing component 102 is a trained machine learning (ML component), and operates as a computer vision component in so far as it detects structure within images. In the present application, the ML component may comprise the new model discussed herein (referred to as dense latent tree (DLT)) or be augmented by the new model—see FIG. 1B for the ways in which the new DLT model may be utilised. That is, the DLT model can be used in a pre-cursor computer system (200) to in-fill detected images prior to passing them to a structure classifier (202). Additionally or alternatively, the DLT model can be used within the structure classifier. Additionally or alternatively, the DLT model can be used in a post-processing system (204) to improve classification. According to one flow, the DLT model is used in the pre-cursor computer system (200) and the structure classifier (202) provides classified outputs. In another flow, the DLT model is used in the structure classifier (202) which produces provisional classified outputs. The provisional classified outputs are supplied to the post-processing (204) using the DLT model which generates classified outputs.

The vehicle 100 is a car in this example, but it can be any form of vehicle. The image processing component 102 can for example be trained to detect any form of visible structure, such as road structure, objects (pedestrians, vehicles etc.).

The image processing component 102 and autonomous vehicle controller 104 are functional components of the autonomous vehicle 100 that represent certain high-level functions implemented within the autonomous vehicle 100. These components can be implemented in hardware or software, or a combination of both. For a software implementation, the functions in question are implemented by one or more processors of the autonomous vehicle 100 (not shown), which can be general-purpose processing units such as CPUs and/or special purpose processing units such as GPUs. Machine-readable instructions held in memory cause those functions to be implemented when executed on the one or more processors. For a hardware implementation, the functions in question can be implemented using special-purpose hardware such as application-specific integrated circuits (ASICs) and/or field programmable gate arrays (FPGAs).

The image capture device 112 can be a three-dimensional (3D) image capture device, which can capture 3D image data. That is, depth information about visual structure, in addition to information about its location within the image place of the camera. This can for example be provided using stereoscopic imaging, LIDAR, time-of-flight measurements etc. For example, the image capture device 112 can be a stereoscopic image capture device having a pair of stereoscopically-arranged image capture units (cameras). The image capture units each capture two dimensional images, but the arrangement of those cameras is such that depth information can be extracted from pairs of two-dimensional (2D) images captured by the cameras simultaneously, thereby providing three-dimensional (3D) imaging. However it will be appreciated that other forms of 3D imaging, which can provide depth information for a two-dimensional array of pixels, can be used in the present context.

As will be appreciated, the above a highly simplified description of certain autonomous vehicle functions. The general principles of autonomous vehicles are known, therefore are not described in further detail.

In the following description, new graphical representations and processing techniques enable the unseen to be 'imaged'. A distribution can be learnt over incomplete images by using Dense Latent Trees (DLT).

Images may be composed as a hierarchy of object parts. This insight is used herein to create a generative graphical model that defines a hierarchical distribution over image parts. In prior models, this leads to intractable inference due to loops in the graph. An alternative model structure, the Dense Latent Tree (DLT) is described herein, which avoids loops and allows for efficient exact inference, while maintaining a dense connectivity between parts of the hierarchy. The usefulness of DLTs is shown for the example task of image completion on partially observed MNIST [10] and Fashion-MNIST [17] data. We verify having successfully learned a hierarchical model of images by visualising its latent states.

Hierarchical structures are abundant in natural images. Scenes are composed of objects, which are composed of parts, which are composed of smaller parts and so on. A generative graphical model over image pixels that has this hierarchical composition at its core, is described herein, referred to as Dense Latent Trees (DLTs). Take for example the MNIST digits [10] which is a known data set for challenging machine learning models; each digit consists of parts (curves and lines), which consist of edges (at different angles), which consist of pixels (black or white). The larger parts are composed from a spatially arranged set of smaller parts. Furthermore, parts are often self-similar, and thus can be shared between the larger parts. E.g. the digits 6 and 9 can share the same 'circle' component, but placed at a different spatial position. Also, each of the circles can share the same type of edges. Since a part can potentially occur at any position in the image, all overlapping positions are accounted for with a 'dense' distribution of parts. In some known models, this dense connectivity implies a non-tree shaped graphical model with intractable exact inference (e.g. [12]). In contrast, the present disclosure sets out an alternative DLT structure with efficient inference and sampling algorithms. The main idea is to use a densely connected (non-tree) model as template and then break up all loops via duplicating child nodes with multiple parents. Each parent gets its own separate child, which results in a tree structured graph.

The utility of such a generative image model is manyfold, and includes segmentation, classification, clustering, in-painting and super-resolution. There are known image processing techniques described for example in the book "Bishop, Christopher M. Pattern recognition and machine Learning, Springer 2006", the contents of which are incorporated by reference. One example task described later is that the model is able to complete missing image parts in a plausible way. As a special case, the model can be trained with missing image parts, i.e. handle problems where complete images are not available. Later the learned parts are visualised to verify that the model has successfully captured a hierarchical distribution over image parts.

Novel contributions described herein include: (1) creating a graphical model that defines images as a distribution of overlapping image parts, (2) learning of the image parts without supervision from incomplete data, (3) formulating efficient inference, learning and sampling in linear time despite quadratically many random variables, and (4) showing a detailed analysis of the learned part distributions and the efficacy of the proposed structure for image completion on two datasets with randomly missing parts.

Previous work on image models include Quad-trees (e.g. [2]), which also feature a hierarchical decomposition of images. Input pixels are split into non-overlapping patches of size 2×2 and each hidden node with its children can be seen as a distribution over object parts. The model is able to express a strong joint distribution for pixels within the same image patch. However, neighbouring pixels in different patches have a weak correlation, depending on the distance to their lowest common ancestor. This leads to block artefacts with discretised borders. In contrast to that, DLTs as described herein partition the image into overlapping patches, and thus model a strong connection between all neighbouring pixels pairs. Slorkey and Williams [14] overcome the fixed quad-tree structure by treating node connectivity as a random variable, which is estimated during inference. This allows for dynamically placing the image parts within the upper layers, but overlap between parts is not possible.

Another strand of research has used the Restricted Boltzmann Machine (RBM) to create a distribution over images with dense connectivity between pixels [12, 5]. Each of the hidden variables can be seen as modelling one factor in the input image parts. The extension [4] models explicitly overlapping parts within a hierarchy. While able to natively handle missing inputs, the main drawback of RBMs is its intractable inference which results in slow approximate sampling and learning algorithms.

Topic models have been proposed for images [15], where objects are decomposed of latent parts. In contrast to DLT, there is only a single latent layer for the parts, i.e. there is no hierarchy for decomposing larger parts into multiple smaller parts.

Various recent work has utilised CNNs for creating a generative distribution over images: Variational Auto-encoders (VAEs) [8], Generative Adversarial Networks (GANs) [6] and the PixelCNN [16]. While excelling at sampling images from a prior or a fixed conditional input, all of the methods require complete data during training. The encoder (in VAEs and GANs) and conditioning CNN (PixelCNN) require all inputs being present. Moreover, these methods do not model a distribution of parts: VAEs and GANs learn a deterministic map from a multi-dimensional random variable to the image space. PixelCNNs model a distribution of pixels, conditioned on the previously generated image parts.

A dense latent tree (DLT) is a parametric probabilistic graphical model, that defines a joint probability distribution p over a set of discrete random variables X=(O,H). The subset O is observed and the remaining set H is hidden or latent. The likelihood for O is given by:

$$p(O) = \sum_H p(O, H)$$

where the sum extends over all states of all variables in H. The model is constructed by combining multiple applications of a core structure called "kernel" to form the overall DLT structure. How to obtain the likelihood, learn the parameters and sample from the DLT are described later.

The kernel is defined by a probabilistic graphical model, where the nodes are random variables and the edges are parametric conditional probability distributions. For simplicity, categorical distributions are chosen for all nodes. However, any choice with tractable marginal inference would be feasible. The kernel has K input nodes $x_k$, $k \in \{0, \ldots, K-1\}$, each of them representing one pixel or an image part. The inputs are connected to a latent node y as parent, which also has a parametric prior. This parent represents the "part of parts" in the image composition. FIG. 1 shows an example, for K=3, of a kernel which is repeatedly applied with shared weights at each layer. The edge parameters are also denoted as "weights" of the kernel. The model describes a mixture of Categorical variables in a manner referred to as Latent Class Analysis [9]. It is fully tractable and enables easily calculation of the likelihood, sampling, training the parameters and inferring a posterior distribution given an observed subset of the nodes using belief propagation (BP).

The nodes of a DLT are organized in layers. The input image is represented as a set of observed nodes O in the lowest layer. O is spatially arranged in 2-D, where each node corresponds to a pixel. The learned parts are represented as hidden nodes H, which are spread over the upper layers. In case of partially observed inputs, the unobserved pixels in the lowest layer become hidden and thus a part of H. For reasons of clarity, the DLT structure is described using the example of the simplest case, i.e. 1-D images as observed input, but the same principles apply for N-D inputs. See FIG. 5 for an example 2-D structure.

Observed nodes may be assigned observation variables derived from an image to be processed. For example, observation variables may use categorical distributions where each state represents a grey-scale intensity value. The bit size of the observations may be adapted depending on the hierarchical image model—that is the nature of the image processing. In one embodiment, 256 bit RGB (Red, Green, Blue) colour images can be used as model input by including three 256 state modes in the first layer per spatial pixel location.

Given a DLT layer, the layer above is constructed by multiple repetitions of the same kernel at all spatial locations. Assuming that the kernel has learned the distribution of specific object parts, the repeated application of the kernel accounts for all possible positions of these parts. Starting from the observed nodes in the lowest layer, all layers above are then constructed recursively.

Figure 2:
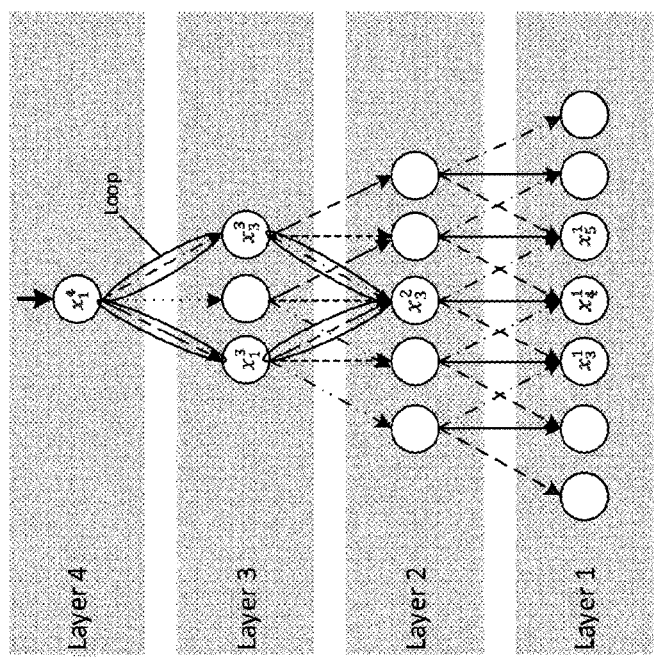
FIG. 2 is an example of a "naïve" DCT structure.

A naive dense structure for a 1-D input of size 7 (in layer 1) and kernels of size 3 is shown in FIG. 2. Kernel weights at different spatial locations are shared, which is indicated by the edge line types. This structure contains multiple parents for the inner nodes and thus induces loops for the BP message flow (Note: the arrows only indicate the conditional relationship between nodes, messages are passed in both directions). Loops radically change the tractability of a graphical model: inference is not exact anymore and would need costly approximate algorithms, like loopy BP or contrastive divergence. Even worse, many approximate inference algorithms do not have any convergence guarantees. To overcome this, the present DLT model is designed to form a tree, and thus reach guaranteed convergence with a single BP pass.

Figure 3:
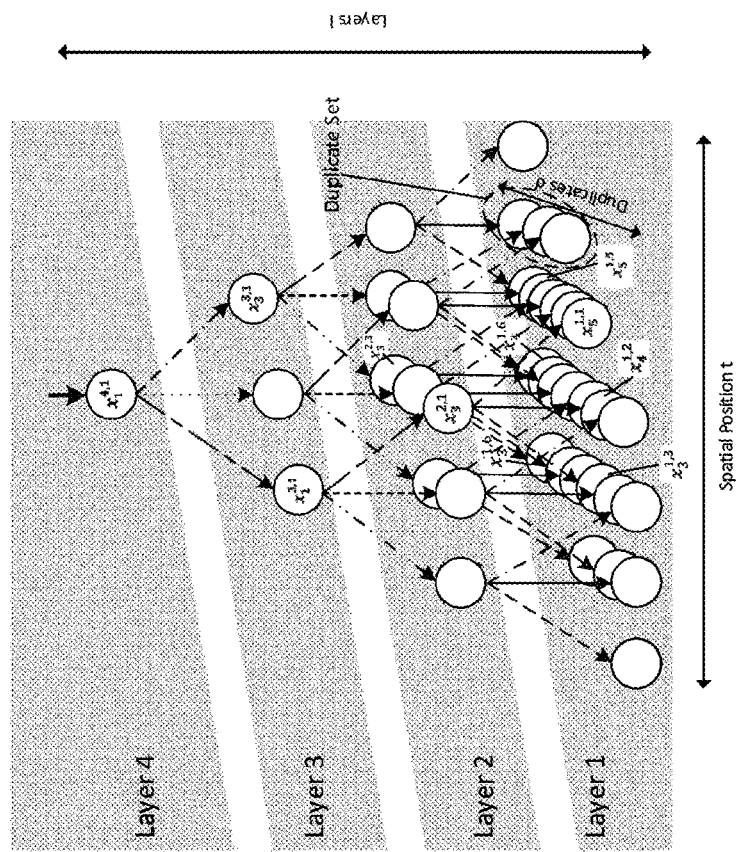
FIG. 3 is an example of an efficient DCT structure.

In contrast to the naive example in FIG. 2, the DLT structure in FIG. 3 is designed to avoid loops, while at the same time having a dense connectivity between layers. The kernels have size 3 and edges with share weights have the same line types. Nodes in a duplicate set overlap each other and are placed along a diagonal. There are 7 duplicate sets in layer 1, thus the number of unique inputs is the same as in FIG. 2. Instead of connecting multiple kernels to the same input, the input node is duplicated including the whole sub-tree below it (i.e. including all ancestors, edges and input observations). By doing this, each kernel gets its exclusive duplicate as input and thus no node has multiple parents. As an example, take the loop in FIG. 2 between the nodes $x_1^4$, $x_1^3$, $x_3^3$ and $x_3^2$. This loop is caused by the multiple parents of node $x_3^2$. Instead of connecting $x_1^3$ and $x_3^3$ to the same node, each of them gets its own duplicate, which are $x_3^{2,1}$ and $x_3^{2,3}$ respectively (see FIG. 3). Furthermore, duplicating the node $x_3^{2,1}$ includes duplicating its whole sub-tree, and thus $x_3^{2,1}$ gets its specific duplicate children $x_3^{1,3}$, $x_4^{1,2}$ and $x_5^{1,1}$. Analogously, $x_3^{2,3}$ gets $x_3^{1,6}$, $x_4^{1,6}$ and $x_5^{1,5}$ as children.

All nodes that are duplicates of each other are called a "duplicate set". Importantly, each duplicate set shares the same kernel weights (indicated by the same line type of the edges). This is to keep the number of parameters constant and it leads to an efficient inference algorithm. FIG. 3 shows a DLT for a 1-D input of size 7 and kernels of size 3. Note that all nodes within a duplicate set in layer 1 receive the same observed data as input (and thus there are only 7 unique inputs), but this constraint is not encoded in the model.

Let $x_t^{l,d}$ be the $d^{th}$ duplicate node at spatial position t in layer 1, with $l \in \{1, \ldots L\}$, $t \in \{1, \ldots, T^l\}$, $d \in \{1, \ldots, D_t^l\}$ (for brevity, we write $l \in L$ instead). L is the number of layers, $T^l$ is the spatial size of layer 1 and $D_t^l$ is the number of duplicates at position t in layer 1. Hence, the total number of spatial positions is $T = \Sigma_l T^l$ and the total number of nodes is $D = \Sigma_l \Sigma_{t \in T^l} D_t^l$. Furthermore, let $K^l$ be the spatial size of the kernel in layer 1.

Take for example a 1-D DLT with a constant kernel size of $K^l = 4$ and stride 2. The described DLT structure leads to quadratic growth for the number of nodes D in respect to a 1-D input image with N pixels: Given this structure, there are closed form solutions for $T^l = 3(2^{L-1}) - 2$, $T = 3(2^L) - 2L - 3$ and $$D = \frac{1}{3}(2^{2L} - 1)$$

(for the derivation see Annexe. A). A spatial size of N is needed for the pixel input in layer 1, i.e. $N = T^l = 3(2^{L-1}) - 2$. Thus the number of layers is $$L = 1 + \log\frac{N+2}{3}$$

and the total number of nodes is quadratic in N with $$D = \frac{1}{3}(2^{2L} - 1) = \frac{4}{27}(N+2)^2 - \frac{1}{3} \in O(N^2).$$

This could be challenging for reasonably large image inputs.

An improvement is offered by an inference algorithm that is linear in the number of inputs N for both runtime and memory complexity, as will now be described.

The following describes how to calculate the marginal likelihood $\mathcal{L}$ for a given observation of O and fixed weights. Following that each node (except the root) has exactly one parent, the joint likelihood of all nodes $X = (O, H)$ is given by $$p(X) = \prod_{x \in X} p(x | x_{par})$$

where $x_{par}$ is the parent of x. Thus the model forms a latent tree, and the exact marginal likelihood can be calculated by a single BP pass through the tree. The BP is started from the leaves up to the root, but other possibilities exist.

The incoming BP message into node $x_t^{l,d}$ is denoted as $m_t^{l,d} = p(O_{x_t^{l,d}} | x_t^{l,d})$, where $m_t^{l,d} = (m_{t,1}^{l,d}, \ldots, m_{t,F^l}^{l,d})$, $F^l$ is the number of states for all nodes in layer 1 and $O_x = \{o | o \in O \text{ and } o \text{ is ancestor of } x\}$ and o is ancestor of x}. The BP is initialised by setting all messages of the input layer $m_t^{1,d}$ to the respective observations for $x_t^{1,d} \in O$. A uniform distribution for all unobserved inputs $x_t^{1,d} \notin O$ is assumed. Then the BP recursively calculates all $m_t^{l,d}$ of the layers above, until reaching the root $m_1^{L,1}$ (for the root $t = d = 1$, since it has no duplicates and only a single spatial position). Assuming $w_f^L$ are the prior weights of the root, the marginal likelihood can be calculated from the message at the top layer L:

$$\mathcal{L} = \sum_f w_f^L m_{1,f}^{L,1}$$

In total, this algorithm would need to calculate the $m_t^{l,d}$ messages $\forall l \in L$, $\forall t \in T^l$, $\forall d \in D_t^l$, resulting in D calculations. However, the message for a certain node depends only on the sub-tree defined by the same node, which includes the connected nodes and weights from the layers below and not the ones above. By design, sub-trees defined by nodes from the same duplicate set have the same structure, the same weights and receive the same observations at their leaves. Thus, each duplicate must receive the same message:

Theorem 1. The messages $m_t^{l,d}$ for all duplicate nodes are equivalent to the unique message $u_t^l$, i.e. $\forall l \in L$, $\forall t \in T^l$, $\forall d \in D_t^l : m_t^{l,d} = u_t^l$.

See Annexe B for the proof. This means that only the unique messages $u_t^l$ need to be calculated and stored. Their number is equivalent to all spatial positions $T = \Sigma_{l \in L} T^l$. Moreover, there is no further memory needed per node, only per unique message. Thus both, runtime and memory complexity is in O(T). In the special case of a 1-D DLT with a constant kernel size of $K^l = 4$ and stride 2 (see the example above and Annexe. A), the number of unique messages T grows linear in the number of inputs N, with $T = 3(2^L) - 2L - 3 = 2(N+2) \in O(N)$.

Figure 4:
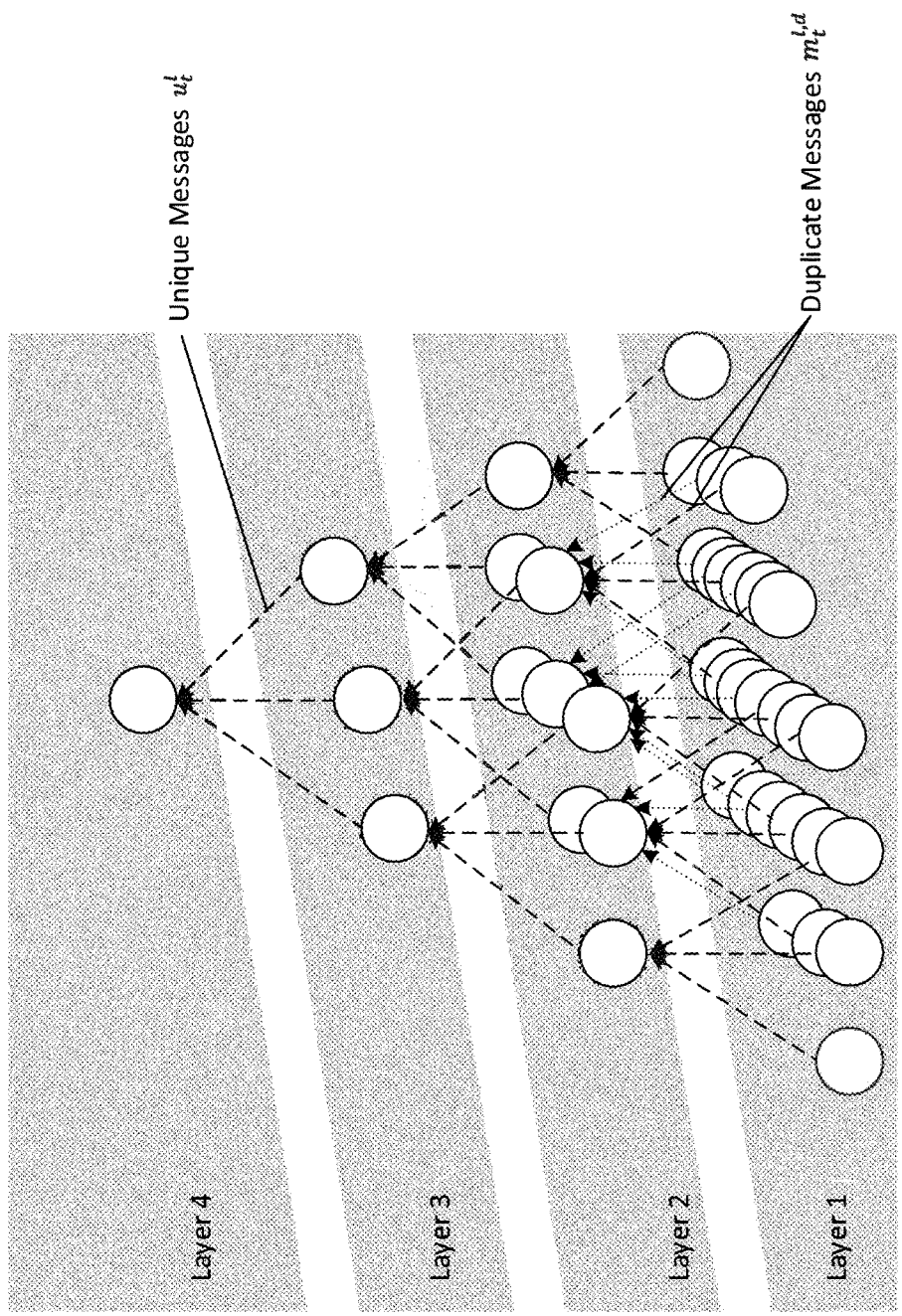
FIG. 4 is a schematic visualisation of a message passing algorithm.

FIG. 4 visualizes the message passing algorithm, including the unique messages $u_t^l$ and duplicate messages $m_t^{l,d}$. Assuming $w_{k,f,g}^{l-1}$ is the shared weight for all connected node pairs with the parent $x_t^{l,d}$ from layer 1 and its $k^{th}$ child $x_{t+k}^{l-1,e}$ from layer 1−1 (where $k \in K^{l-1}$, $e \in D_t^{l-1}$, $g \in F^l$ and $f \in F^{l-1}$). Thus $w_{k,f,g}^{l-1} = p(x_{t+k}^{l-1,e} = f | x_t^{l,d} = g)$ and all unique messages can be calculated as:

$$u_{t,g}^l = \prod_k \sum_f w_{k,f,g}^{l-1} u_{t+k,f}^{l-1}$$

The product of incoming belief messages is calculated or shown in Annexe D. Unique messages $u_t^l$ that need to be calculated and held in memory are shown as dashed. The dashed duplicate messages $m_t^{l,d}$ have the same content, and thus no processing and no memory is needed for them.

The DLT models have application to learning weights during training.

Previous approaches for learning LT weights have applied an EM-procedure (e.g. [3]), where the bottom-up message passing is followed by a top-down pass to obtain the pairwise posteriors for each edge, which is then used to adjust the edge weights. However, in the DLT case, top-down messages are not shared between nodes in a duplicate set, since the parent of each node is different. Thus the number of top-down messages is in O(D), making a top-down pass intractable.

Instead, a different approach is followed: observe that the likelihood $\mathcal{L}$ can be calculated in a feed-forward way from the unique messages, using only differentiable operations as defined in Eq. 4. For numerical stability, log $\mathcal{L}$ is targeted and optimised via Stochastic gradient ascent (SGA). This also incorporates the advantages of SGA in general, like training on arbitrary large datasets.

There is one caveat: during training, it should be ensured that the weights form a valid distribution, i.e. $w_{k,f,g}^l \geq 0$ and $\Sigma_f w_{k,f,g}^l = 1$ ($\forall l$, k, g). This can be achieved by re-parametrizing the model to use scores $s_{k,f,g}^l$ instead and defining the weight as $$w_{k,f,g}^l = \frac{\exp(s_{k,f,g}^l)}{\sum_f \exp(s_{k,f,g})}.$$

The DLT models have applications to sampling.

For example, one may be interested in sampling all nodes X, conditioned on observations $O \subset X$. $O = \emptyset$ is possible, in which case it is possible to sample from the prior. This is straightforward for a conventional LT: first do an inference pass with the observations and then sample all nodes recursively, starting with the root. Besides the problem that this would involve O(D) operations for DLT, this would lead to diverging results for all duplicates. During training, the duplicates were tied through the bottom-up message from the observed nodes, i.e. the input images. However, there is no consistency enforced when sampling top-down, and thus each duplicate can be in a different state. In terms of the image pixels (i.e. the lowest layer of the model), this would lead to multiple sampled states for the same pixel.

In order to avoid these inconsistencies, sampling is done under the constraint that all duplicates must take the same state. Thus only a single sample $z_t^l$ for all duplicate nodes $x_t^{l,d}$ is obtained. This leads to the following sampling strategy: First, do an inference pass to obtain the $u_t^l$. Then start with the root $x_1^{L,1}$ and take a sample $z_1^L = (z_{1,1}^L, \ldots, z_{1,F}^L)$, $z_{1,f}^L \in \{0,1\}$, $\Sigma_f z_{1,f}^L = 1$ from the posterior $p(x_1^{L,1}|O)$:

$$z_1^L \sim \mathrm{Cat}\left(\frac{u_{1,f}^L w_f^L}{\sum_f u_{1,f}^L w_f^L}\right)$$

Furthermore, each $x_t^{l,d}$ from a lower layer l is sampled from the posterior $p(x_t^{l,d}|y_t^{l,d}, O)$, where $y_t^{l,d}$ is the parent of $x_t^{l,d}$ (and thus corresponds to one of the samples $z_t^{l+1}$). Since all samples are constrained to have the same state it holds $\forall d \in D_t^l : x_t^{l,d} = x_t^l$, and thus it is sufficient to take a single sample from the product of posteriors: $z_t^l \sim \Pi_d p(x_t^l|y_t^{l,d}, O)$. Furthermore, there are $K^l$ parents with different spatial locations at the positions t–k($k \in K^l$), each of them having $D_{t-1}^{l+1}$ duplicates. Each of the parent duplicates is in the same state $z_{t-k}^{l+1}$ which leads to $$z_t^l \sim \prod_k p(z_t^l|z_{t-k}^{l+1}, O)^{D_{t-k}^{l+1}}.$$

Given all samples of the layer above $z_t^{l+1}$, the product of the conditional posteriors $\pi_t^l = (\pi_{t,1}^l, \ldots, \pi_{t,F}^l)$ of all $D_t^l = D_{t-k}^{l+1}$ parents of the set are calculated first. Then $z_t^l$ is sampled from the product distribution:

$$\pi_{t,f}^l = \prod_k \left( u_{t,f}^l \sum_g w_{k,f,g}^l z_{t-k,}^{l+1} \right)^{D_{t-k}^{l+1}}$$

$$z_t^l \sim \mathrm{Cat}\left(\frac{\pi_{t,f}^l}{\sum_f \pi_{t,f}^l}\right)$$

where $g \in F^{l+1}$ and $f \in F^l$. This sampling step is repeated for all spatial positions t and layers l, until the inputs $z_t^1$ have been sampled. Thus, the overall complexity is in O(T), the same as for the likelihood.

The inventors have verified that the DLT is able to learn a hierarchical distribution of image parts from incomplete training data, as exemplified in the following in-painting with randomly missing patches as an example task. The training data is corrupted via missing patches from the same distribution. The DLT performance is compared to (1) the same model trained on complete data and (2) other common generative and discriminative models. Finally, the learned hierarchy of image parts is visualised.

MNIST [10] digits and Fashion-MNIST [17] clothing items have been chosen as example data, due to its simple yet sufficiently rich structure to learn a hierarchy of parts. The images have a resolution of 28×28 and a patch of 12×12 is removed within each image of the train and test sets. The missing location is chosen randomly from a uniform distribution for each image. DLT model categorical distributions as input, and thus each pixel is discretised into black and white for MNIST and 16 grey-scale values for Fashion-MNIST. To measure the in-painting performance, the pixel values are sealed to the range [0,1] and then the mean squared error (MSE) between the original and in-painted pixels within the missing patches is reported. Note that the class label is not used in the experiments.

Figure 5:
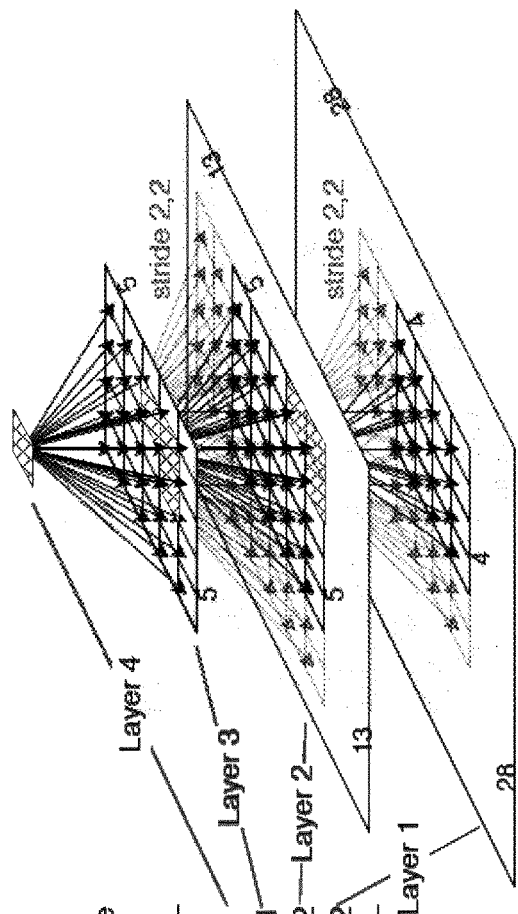
FIG. 5 is an example of a 2D image model structure.

A 4 layer DLT is constructed as shown in FIG. 5. In FIG. 5, each tile represents a spatial location, and thus there are potentially many duplicate nodes per tile (depending on the layer). The conditional dependencies for the parents, shown hashed, are shown as arrows, but the same pattern is repeated for every parent in every layer. The input images require a spatial resolution $T^l$ of 28×28 and two states for black and white in layer 1. Each subsequent layer has a lower spatial size, until reaching the single root, with size 1×1. The first two kernels have a stride of 2, which leads to a reduced size of the upper layers. The kernel sizes $K^l$ of 4×4 and 5×5 have been chosen to result in a single root at layer 4, while also providing sufficient overlap between kernels. The number of states $F^l$ is increased in the upper layers, in order to learn increasingly complex parts. This leads to a total of 1,691,648 parameters for the kernel weights.

The DLT includes 10,651 random variables, while only 979 unique messages need to be calculated to obtain the likelihood. The model was implemented in tensorflow [1]

and trained using SGA for 100 epochs on the 60,000 training images, while using a batch size of 128. A single inference pass took 71 ms per batch, and sampling took 41 ms per sample on a Nvidia GTX 1080Ti For in-painting, the missing patch was filled by taking a single sample from the model, conditioned on the observed parts.

The DLT is compared to a Quad-tree, RBM and CNN of similar architecture. The Quad-tree has 4 layers with shared weights and the same number of states as the DLT per layer. Each of the nodes in layers 2 and 3 has 2×2 children (as a regular Quad-tree), but the root has 7×7 children in order to evenly connect to a single root. The RBM has a fully connected hidden layer with 4,096 states and missing values are handled according to [7]. The CNN is an Auto-encoder U-net with skip connections, with an architecture inspired by [11]. The architecture of the contracting part was set to mirror the DLT, via selecting the same number of layers, the same kernel sizes and strides, and choosing the number of channels to be equivalent to the respective number of DLT states. The expanding part mirrored the contracting one, using the convolution transpose operation. The CNN (complete) was trained with incomplete images as input and the corresponding complete image as target. In order to train the CNN with incomplete targets, an auto-encoder loss was calculated between the known parts of the image.

After training the DLT on incomplete MNIST, it achieved a negative log-likelihood of 1,418.56 on the test set, which is only slightly larger than for training on complete MNIST with 1,406.78. In comparison, the Quad-tree reached 69.85 on incomplete and 62.18 on complete data. Note that the difference magnitude is due to the number of input nodes: The DLT had 10,000 observed nodes in layer 1, while the Quad-tree has only 784.

Figure 9:
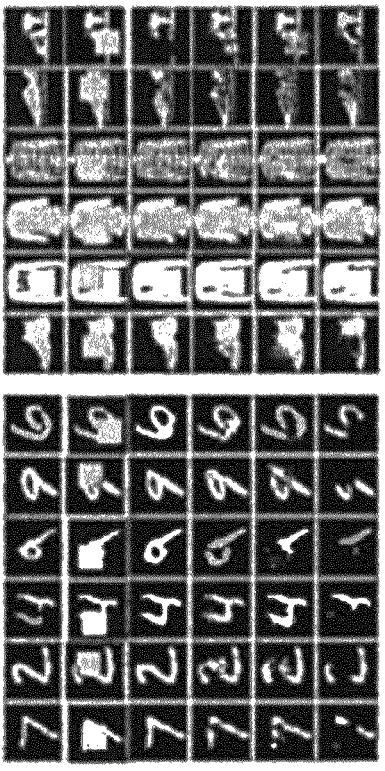
FIG. 9 is Table 1 showing in-painting results to compare models trained on incomplete data.

Table 1 in FIG. 9 shows the in-painting results. Table 1 shows in-painting MSE results for different models trained on complete and incomplete data, for both the MNIST and Fashion-MNIST datasets. Additionally, 6 example predictions for incomplete data are shown on the right. The first row shows the ground-truth, the second row shows the observed part (with the missing part in grey). All generative models (DLT, Quad-tree and RBM) have almost the same performance on complete and incomplete data. This confirms the intuition that an explicit model of the input distribution helps to fill in randomly missing data. The CNN does well as a discriminative model trained on complete data, but fails in dealing with missing parts. The Quad-tree suffers from block-artefacts, while the DLT can produce smooth images due to the overlapping kernels. The RBM completions are noisy, possibly due to the non-hierarchical structure. Further qualitative results are shown in Annexe. C.

Figure 6:
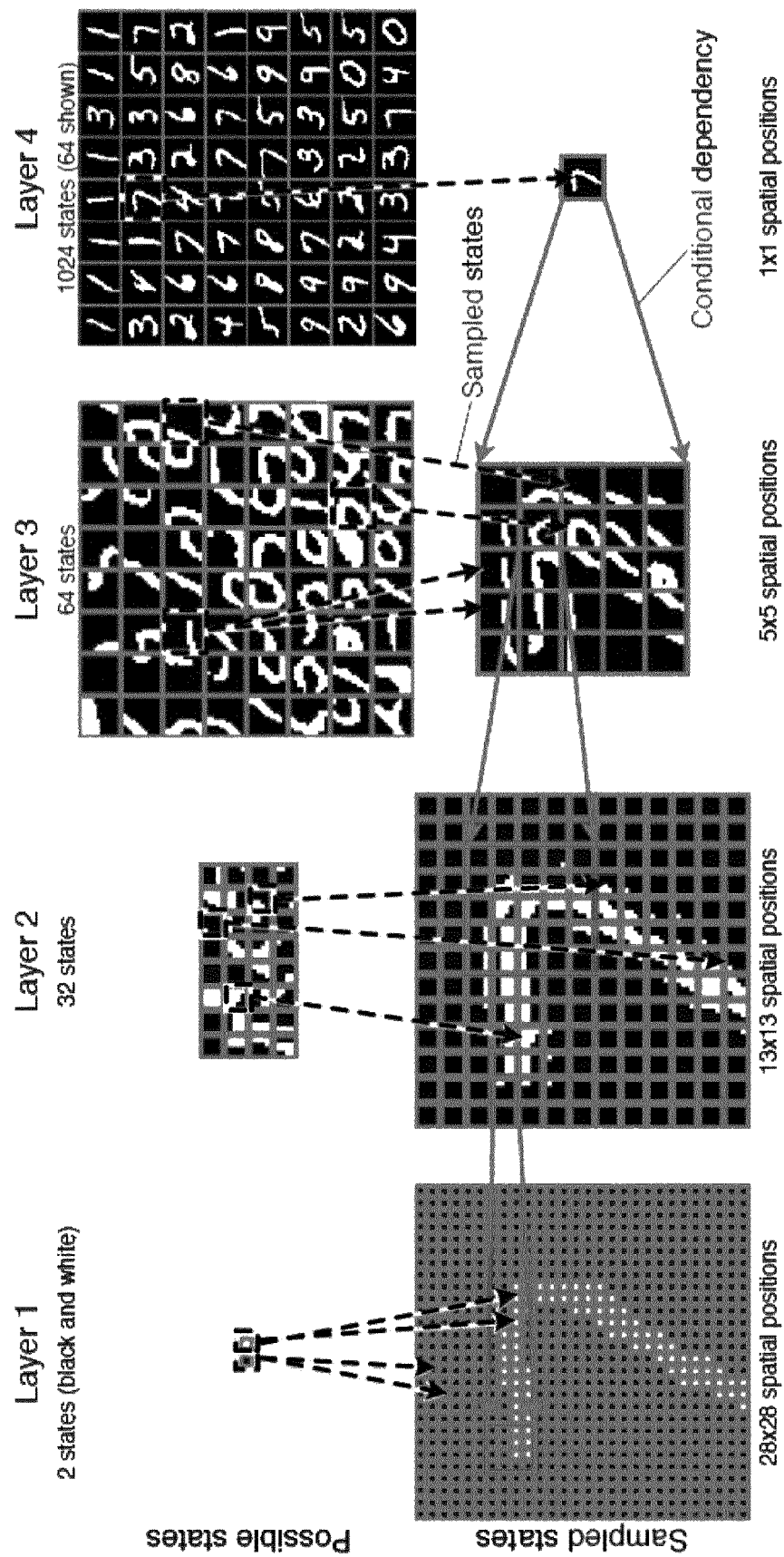
FIG. 6 is a set of MNIST data images showing how the DLT model comprises MNIST images into a hierarchy of parts.

FIG. 6 shows how the DLT composes MNIST images into a hierarchy of parts. In FIG. 6, the top row is learned DLT parts per state per layer, when trained on incomplete MNIST. The bottom row is a visualisation of the sampling process. To visualise a possible state f of layer l, a new DLT was created from the sub-graph that has a single node from layer l as root, and its prior deterministic set to state f. Each state was then represented by a sampled image from this sub-graph. E.g. for the third layer, this is a DLT with a single node in layer 3, 5×5 nodes in layer 2 and 12×12 spatial position in layer 1. This leads to 64 sampled images of size 12×12, one for each state.

It was observed that layer 2 combines pixels into edge filters at different translations and orientations. Layer 3 learnt to combine the edges of layer 2 into parts of digits. It included lines at different angles, curved lines, but also circles and other shapes. Layer 4 combined these parts into various types of complete digits.

Figure 8:
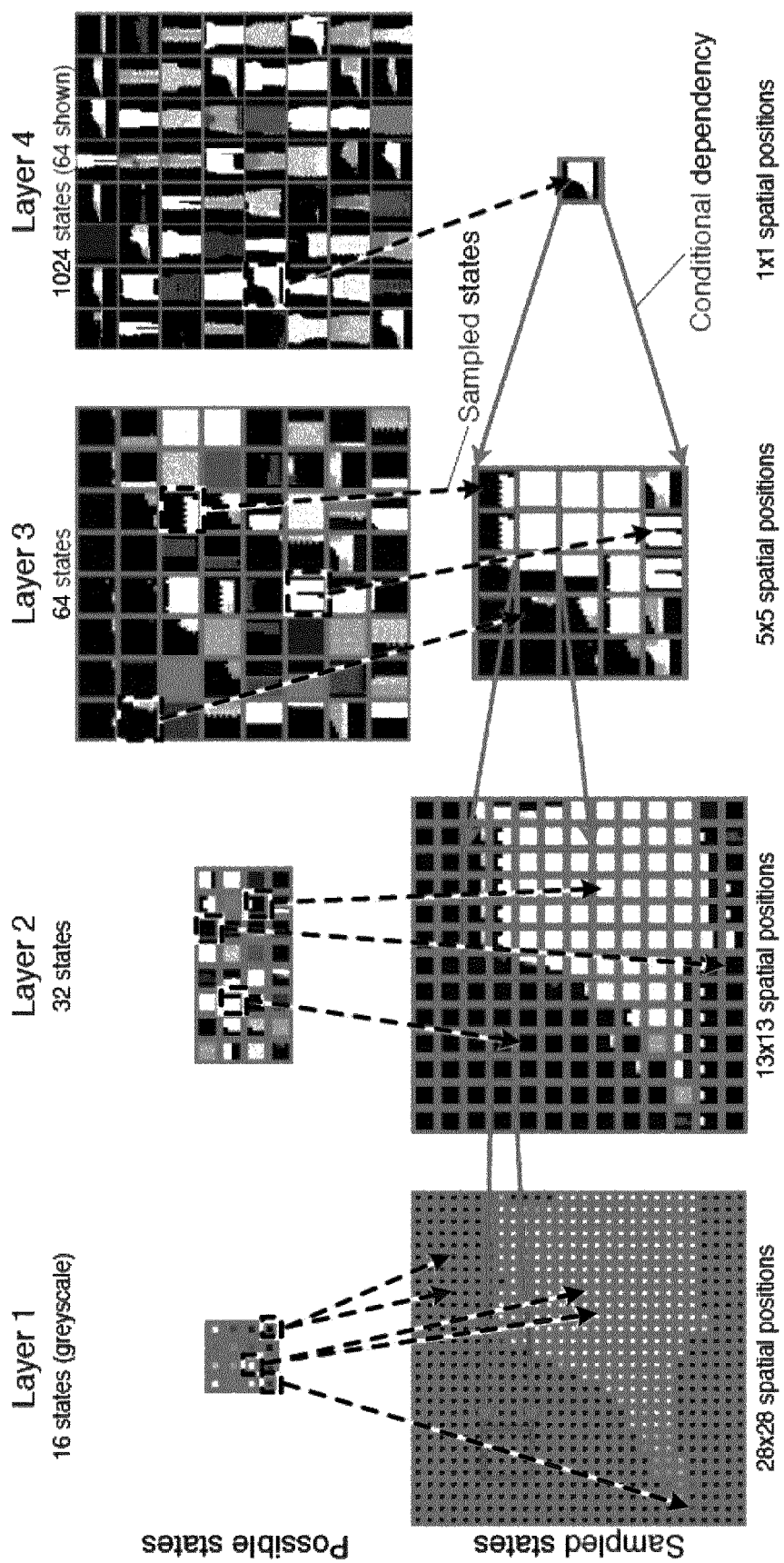
FIG. 8 shows results of an example of using DCTs in the Fashion-MNIST data set.

The bottom row shows how a specific image is sampled. Starting with the root at layer 4, where one state out of 1024 is randomly selected from the prior (shown via the dashed arrow), then each of the 5×5 nodes in layer 3 is conditioned on layer 4, selecting one of its 64 possible states. The conditional dependency is highlighted via the solid-line boxes and arrows. Note that the samples in layer 3 are presented on a 5×5 grid without overlap, but when combined in layer 1 there is significant overlap between the receptive fields of the upper layers. The parts from layer 3 are sampled to form a coherent representation of the edges present in the digit 7. Then the same process is repeated for layers 2 and 1. FIG. 8 shows the equivalent results for Fashion-MNIST.

In FIG. 8, the top row shows learned DLT parts per state per layer, when trained on incomplete Fashion-MNIST. The bottom row shows visualisation of the sampling process.

The Dense Latent Tree model described herein has the ability to learn a hierarchical composition of images into parts, even when only incomplete data is available. DLTs allow for efficient inference and learning due to its tree structure, while incorporating a dense connectivity with overlapping parts that is more similar to CNNs. Other embodiments may comprise different connectivity patterns, like dilated convolutions and skip connections, as well as extensions to other non-categorical distributions.

REFERENCES

[1] Martin Abadi et. al. TensorFlow: Large-Scale Machine Learning on Heterogeneous Distributed Systems. Technical report, 2015.

[2] Charles A Bauman and Michael Shapiro. A multiscale random field model for Bayesian image segmentation. *IEEE Transactions on image processing*, 3(2): 162-177, 1994.

[3] Myung Jin Choi, Vincent Y F Tan, Animashree Anandkumar, and Alan S Willsky. Learning Latent Tree Graphical Models. *J. Mack. Learn. Res.*, 12:1771-1812, July 2011.

[4] S Eslami and Christopher Williams. A generative model for parts-based object segmentation. In *Advances in Neural Information Processing Systems*, pages 100-107, 2012.

[5] S M Ali Eslami, Nicolas Heess, Christopher K I Williams, and John Winn. The shape boltzmann machine: a strong model of object shape. *International Journal of Computer Vision*, 107(2): 155-176, 2014.

[6] Ian Goodfellow, Jean Pouget-Abadie, Mehdi Mirza, Bing Xu, David Warde-Farley, Sherjil Ozair, Aaron Courville, and Yoshua Bengio. Generative adversarial nets. In *Advances in Neural Information Processing Systems*, pages 2672-2680, 2014.

[7] Geoffrey Hinton. A Practical Guide to Training Restricted Boltzmann Machines. Technical report, University of Toronto, 2010.

[8] Diederik P Kingma and Max Welling. Auto-encoding variational bayes. *arXiv preprint arXiv:*1312.6114, 2013.

[9] Paul Felix Lazarsfeld and Neil W Henry. *Latent Structure Analysis*. Houghton Mifflin, 1968.

[10] YannLeCun. The MNIST database of handwritten digits. http://yann.lectin, com/exdb/mnist/, 1998.

[11] Olaf Ronneberger, Philipp Fischer, and Thomas Brox. U-net: Convolutional networks for biomedical image segmentation. In *International Conference on Medical image computing and computer-assisted intervention*, pages 234-241. Springer, 2015.

[12] Ruslan Salakhutdinov and Geoffrey Hinton. Deep Boltzmann Machines. In *Aistats*, volume 1, pages 448-455, 2009.

[13] Ruslan Salakhutdinov and Hugo Larochelle. Efficient learning of deep Boltzmann machines. In *Proceedings of the Thirteenth International Conference on Artificial Intelligence and Statistics*, pages 693-700, 2010.

[14] A J Slorkey and Christopher K I Williams. Image modeling with position-encoding dynamic trees. *Pattern Analysis and Machine Intelligence, IEEE Transactions on*, 25(7):859-871, 2003.

[15] Erik B Sudderth, Antonio Torralba, William T Freeman, and Alan S Willsky. Learning hierarchical models of scenes, objects, and parts. In *Computer Vision, 2005. ICCV 2005. Tenth IEEE International Conference on*, volume 2, pages 1331-1338. IEEE, 2005.

[16] Aaron van den Oord, Nal Kalchbrenner, Lasse Espeholt, Oriol Vinyals, Alex Graves, and Others. Conditional image generation with pixelcnn decoders. In *Advances in Neural Information Processing Systems*, pages 4790-4798, 2016.

[17] Han Xiao, Kashif Rasul, and Roland Vollgraf. Fashion-mnist: a novel image dataset for benchmarking machine learning algorithms. *arXiv preprint arXiv:*1708.07747, 2017.

ANNEXE A DERIVATION OF CLOSED FORMS FOR $T^l$, T AND D

We are interested in obtaining a closed form solution for the number of spatial positions per layer $T^l$, the total number of spatial positions T and the total number of nodes D, given a constant kernel size $K^l=4$ and stride 2. Thus each kernel has four children and is repeated at every second position within each layer. This leads to a structure as shown in FIG. 7 (unrolled for L=5 layers).

Figure 7:
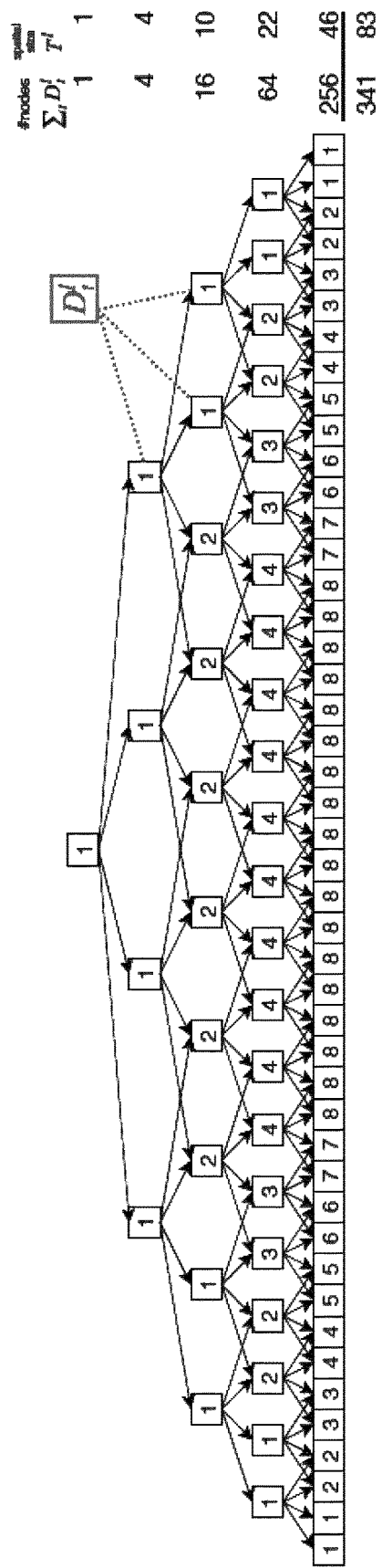
FIG. 7 illustrates one example of a DCT structure.

FIG. 7 shows a DLT with constant $K^l=4$ and stride 2. The number of duplicates $D_t^l$ is shown inside the square at each spatial position. For this graph, $D=\Sigma_l\Sigma_t D_t^l=341$ and $T=\Sigma_l T^l=83$ For the derivation of these quantities, it is easier to number the layers in reverse order starting from the root, i.e. $\hat{l}=L-l+1$. We observe that $T^{\hat{l}}$ can be obtained via a recursive formula as $T^1=1$ and $T^{\hat{l}}=2(T^{\hat{l}-1}+1)$, which leads to a closed form of $T^{\hat{l}}=3(2^{\hat{l}-1})-2$, and thus:

$$T^l=3(2^{L-l})-2$$

Solving for T leads to:

$$T = \sum_l T^l = \sum_l 3(2^{L-l}) - 2 = 3(2^L) - 2L - 3$$

FIG. 7 shows the number of duplicates $D_t^l$ per spatial position. We note that $D_t^l$ can be obtained by summing over its parents as $D_t^l=\Sigma_k D_{t-k}^{l+1}$. Furthermore, the number of nodes per layer can be derived as $\Sigma_t D_t^{\hat{l}}=2^{2(\hat{l}-1)}$. Solving for D leads to:

$$D = \sum_l \sum_t D_t^l = \sum_t 2^{2(l-1)} = \frac{1}{3}(2^{2L}-1)$$

ANNEXE B PROOF OF THEOREM 1

Theorem 1. The messages $m_t^{l,d}$ for all duplicate nodes are equivalent to the unique message $u_t^l$, i.e. $\forall l \in L$, $\forall t \in T^l$, $\forall d \in D_t^l: m_t^{l,d}=u_t^l$.

Proof. We prove this via induction over l: Let $o_t$ be the observed input at position t. By design, each of the input duplicates in layer 1 has the same observation, and thus $\forall t \in T^1$, $\forall d \in D_t^1: o_t=m_t^{1,d}=u_t^1$. Now assuming it holds that all duplicate messages in layer l−1 have the same value, i.e. $\forall t \in T^{l-1}$, $\forall d \in D_t^{l-1}$, $\forall f \in F^{l-1}: m_{t,f}^{l-1,d}=u_{t,f}^{l-1}$.

Then also all messages at layer l must be identical:

let $\{m_{t+k}^{l-1,d(k)}\}_{k \in K^l}$ be the messages of the $K^l$ children of $x_t^{l,d}$ within layer l−1. Then $\forall t \in T^l$, $\forall d \in D_t^l$, $\forall g \in F^l$ we can calculate the BP message as:

$$m_{t,g}^{l,d} = \prod_k \sum_f w_{k,f,g}^{l-1} m_{t+k,f}^{l-1,d(k)} = \prod_k \sum_f w_{k,f,g}^{l-1} u_{t+k,f}^{l-1} = u_{t,g}^l$$

Figure 10:
FIG. 10 is Table 2 showing in-painting results to compare models trained on complete data.

FIG. 10 shows Table 2 which illustrates in-painting qualitative results for models trained on complete data. Shown are 6 example images, the first row shows the ground-truth, the second one shows the observed part (with the missing patch in grey) and the following rows show results for DLT. Quad-tree, RBM and CNN.

Table 2 shows the example predictions for complete data, corresponding to Table 1.

Figure 11:
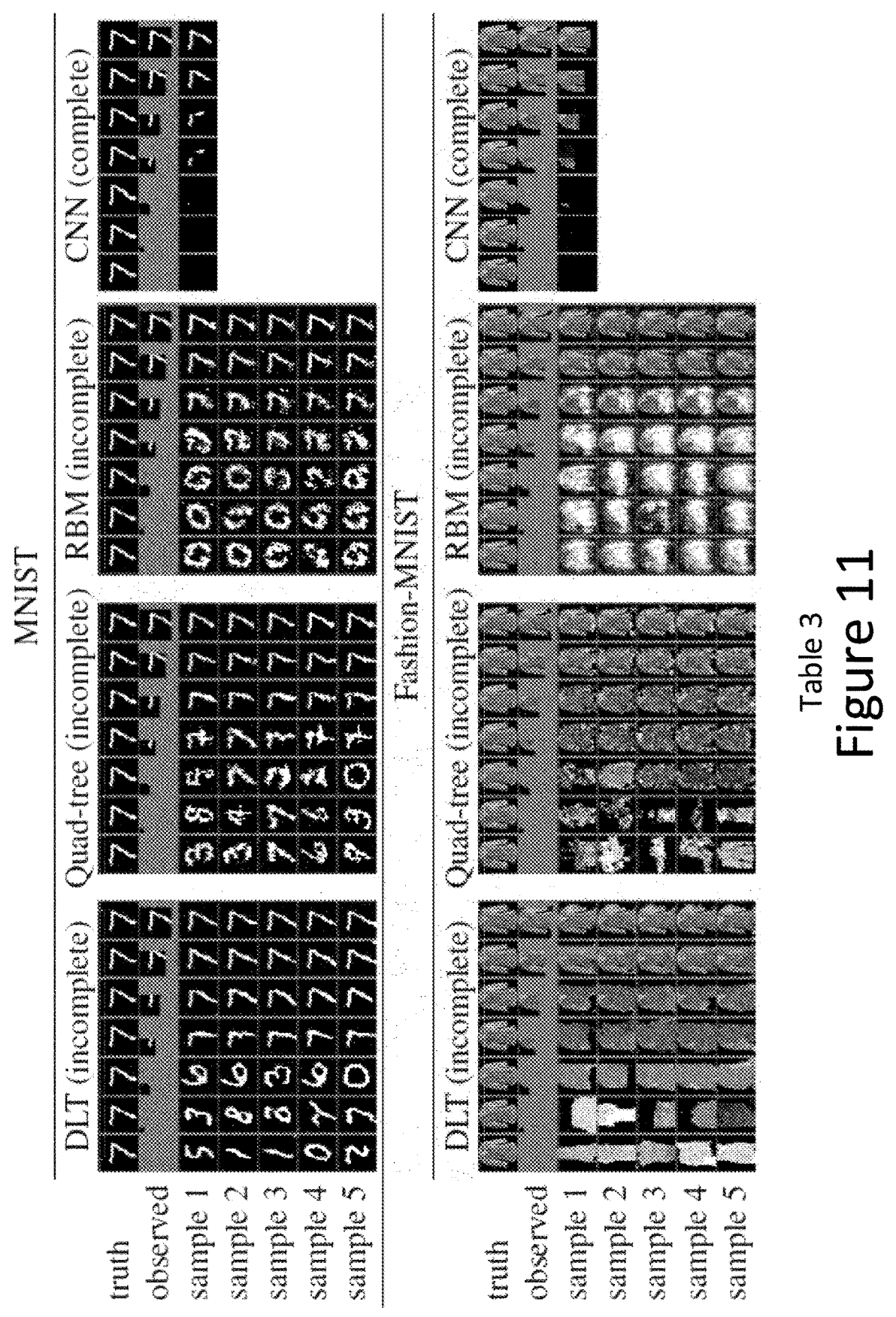

Table 3 in FIG. 11 shows the sampling result for different models trained on incomplete data, when a patch of varying size is observed. Table 3 shows sampling results for an observed part of varying size. The first row shows the ground-truth image, the second one the observed parts, and the last 5 rows show different samples. The CNN output is deterministic, thus only one sample is shown. In the first column on MNIST, nothing is observed and thus the DLT samples are from the prior only, which shows random digits. In the next two columns, the model observes a few pixels in the upper left corner and hence samples random numbers that are consistent with the observed parts. From the 4th column on it becomes clear that the observed number must be a seven, and thus the models samples the digit 7 with varying strokes in the lower part. The corresponding results for the Quad-tree, RBM and CNN are provided in FIG. 11. The Fashion-MNIST results show a similar pattern of randomness. The outline and overall colour of clothing items is visible. However, the fine texture is lost and the whole item looks smooth.

The Quad-tree shows a similar pattern than DLT, i.e. sampling random numbers from the prior in the first 3 columns, but then converging towards the ground-truth. The Quad-tree typical block-artefacts are clearly visible.

The RBM tends to sample the digit zero (for MNIST) and a jacket-like cloud (for Fashion-MNIST) when only few parts are observed. Starting with column 4, the convergence to the input image becomes visible. Overall, the samples look more noisy than for the DLT and Quad-tree.

The CNN showed poor results when trained with incomplete targets (see Table 1) and thus included here are the results for the CNN trained on complete targets instead. This CNN had the best results with an MSE of 0.1082 for completing missing patches of size 12×12, i.e. in the case that test and training data corruption follows the same pattern. In this experiment, the observed part is varying in size and thus different than in the training data. In the first 3 columns, the CNN predicts the image as complete black. This is probably due to the non-generative nature of this CNN, which cannot sample from a prior. In the 4th and 5th column, when the other models clearly pick up the tendency towards the target, the CNN is still not completing the image in a plausible way. Thus the CNN does well for the exact task that it has been trained on, but poorly generalises to similar in-painting tasks.

ANNEXE D

The product of incoming belief propagation messages can be calculated into y from its children, i.e. $p(x_1, \ldots, x_K|y)$, as $$y_g = \prod_k \sum_f w_{k,f,g} x_{k,f}$$

where $g \in \{1, \ldots, G\}$, $y = (y_1, \ldots, y_G)$, $f \in \{1, \ldots, F\}$, $x_k = (x_1, \ldots, x_F)$, $x_{k,f}$ is the observed probability of $x_k$ being in state f, and $w_{k,f,g}$ is the conditional probability of $x_k$ being in state f when y is in state g. Then the marginal likelihood of the kernel is $$\mathcal{L} = \sum_g w_g y_g$$

where $w_g$ is the prior of y being in state g.

The invention claimed is:

1. A computer implemented method of processing an image comprising a plurality of pixels, using a hierarchical image model stored in computer memory wherein:
   in a first layer of the hierarchical image model each observed pixel of the image is allocated to one or more input nodes of the first layer,
   a set of the one or more input nodes is assigned to a hidden node of a second layer representing a part or subpart of the image in the second layer, to create a subtree for the hidden node, in which the hidden node is a parent node and the one or more input nodes are child nodes,
   a duplicate set of input nodes of the first layer is assigned to a duplicate of the hidden node in the second layer representing the same part or sub part of the image, thereby forming a dense latent tree in which the subtree is duplicated such that no child node has multiple parents in the dense latent tree yet all parent-child relationships between the first and second layer are represented,
   the method comprising, by at least one processor coupled to access the memory, assigning variables to the one or more input nodes, the hidden node and the duplicate node and recurringly modifying the variables to process the image.

2. The computer implemented method according to claim 1 wherein each observed pixel of the image is allocated to one or more input nodes of the first layer by storing a respective observation variable in a computer memory in association with an identifier of the one or more input nodes.

3. The computer implemented method according to claim 1 in which the image is incomplete and each non-observed pixel of the image is allocated to one or more input nodes of the first layer by storing a respective latent variable in a computer memory in association with an identifier of the one or more input nodes of the first layer to which each non-observed pixel corresponds.

4. The computer implemented method according to claim 1 comprising processing the image by sampling the modified variables to sample a probable image part defining a particular shape at a particular location in the image, the particular shape being generated at the second or a higher layer in the hierarchical image model, wherein all nodes in each duplicate set are constrained to take the same value during sampling.

5. The computer implemented method according to claim 1 comprising completing, in a precursor system, an incomplete image prior to subsequent processing, wherein the completing the incomplete image comprises recurringly modifying variables of input nodes to which no observation variable was assigned.

6. The computer implemented method according to claim 5 comprising the step of subsequently processing the complete image in a convolutional neural network or other artificial intelligent classification system.

7. The computer implemented method according to claim 1 comprising processing images output from a segmentation computer system to complete non-observed pixels of the images output from the segmentation computer system and/or take a different sample of probable images.

8. The computer implemented method according to claim 1 comprising classifying parts or subparts of a captured image representing a scene in which some parts of the scene are obscured in the captured image.

9. The computer implemented method according to claim 1 wherein the method of processing the image comprises generating a version of the image which has been received at a first resolution in a higher resolution, by assigning latent variables to some of the one or more input nodes of the hierarchical image model in the higher resolution.

10. The computer implemented method according to claim 1 in which the hierarchical image model has at least one or more further layers, wherein nodes in the second layer represent sub-parts of the image and nodes in the one or more further layers represents a part of the image comprising multiple sub-parts of the second layer.

11. The computer implemented method according to claim 1 comprising storing in a computer memory, a respective random variable, assigned to each hidden node of the second layer in a first step, and modifying the random variable in subsequent steps to converge on a set of probable variables for the hidden nodes of the second layer.

12. A computer memory of an image processing system storing a generative graphical model for processing spatial relationships as a plurality of nodes arranged in layers, the generative graphical model comprising a plurality of kernels, each kernel having a group of input nodes for receiving observations in a lowest layer of the model, and a root node representing a latent variable in an upper layer of the generative graphical model, wherein the generative graphical model comprises additional nodes assigned as duplicate nodes to form a duplicate set of each of at least some of the input nodes, wherein the duplicate nodes are connected in a duplicate subtree resembling the subtree of the input node of which it is a duplicate whereby each input node is exclusive for a specific kernel and no node has multiple parents.

13. The computer memory of an image processing system storing the generative graphical model according to claim 12 wherein the computer memory further stores computer executable instructions that, when executed, cause a computer of the image processing system to process partly complete images to generate probable image data of parts or subparts of the partly complete image by recurringly modifying the latent variable of the root node.

14. The computer memory of the image processing system storing the generative graphical model according to claim 13 in which some input nodes in the lowest layer have observation values assigned to them, and other nodes in the lowest layer have latent variables assigned to them.

15. The computer memory of the image processing system storing the generative graphical model according to claim 12 in which all input nodes in the lowest layer have observations assigned to them.

16. A method of generating belief propagation messages in the generative graphical model stored in the computer memory of claim 12 in which each kernel has k child nodes in a child layer and a parent node in a parent layer, the method comprising for each kernel,
   determining for each state f of a child node at a first location a state product of (i) a kernel weight for each state f and (ii) a belief propagation message for a child node at a second location displaced by k nodes from the first location;
   summing the state products over all states in the child layer to generate a state sum of for each child node;
   generating for each parent node a kernel product of the state sums, the kernel product being a unique belief propagation message to propagate to the parent node.

17. The method according to claim 16, wherein the kernel weight for each state f is the conditional probability that x is in that state f when y is in state g, where x is an observed or latent variable of a child node at a first location and y is the latent variable of the parent node.

18. The method according to claim 16 comprising sampling a probable image part defining a particular shape at a particular location in the image, the particular shape being generated at a parent layer by propagation of the belief propagation messages between layers.

19. A method of training a neural network using the generative graphical model stored in the computer memory as claimed in claim 12, in which each kernel has k child nodes in a child layer and a parent node in a parent layer, the method comprising for each kernel:
   generating a set of unique belief propagation messages for propagation from each child node in a child layer to its parent node in a parent layer, the set of unique belief propagation messages comprising a unique belief propagation message for a root node of the generative graphical model;
   calculating a marginal likelihood of the generative graphical model by summing over all possible states in the root node of the generative graphical model and calculating a product of a prior weight of the root node and the belief propagation message for the root node; and
   optimising the marginal likelihood using a neural network optimisation algorithm.

20. An image processing computer system comprising one or more computers programmed to process an image comprising a plurality of pixels, the one or more computers comprising at least one processor arranged to execute one or more computer programs and computer memory accessible by the one or more processors for storing variables allocated to one or more nodes of a hierarchical image model representing the image,
   the computer memory storing the hierarchical image model wherein:
      in a first layer of the hierarchical image model each observed pixel of the image is allocated to one or more input nodes of the first layer,
      a set of the one or more input nodes is assigned to a hidden node of a second layer representing a part or subpart of the image in the second layer, to create a subtree for the hidden node, in which the hidden node is a parent node and the one or more input nodes are child nodes; and
      a duplicate set of input nodes of the first layer is assigned to a duplicate of the hidden node in the second layer representing the same part or sub part of the image, thereby forming a dense latent tree in which the subtree is duplicated such that no child node has multiple parents in the dense latent tree yet all parent-child relationships between the first and second layer are represented; and
   the at least one processor coupled to access the memory to assign variables to the one or more input nodes, the hidden node and the duplicate node and recurringly modifying the variables to process the image.

* * * * *